US006129775A

United States Patent [19]

Conrad et al.

[11] Patent Number: 6,129,775

[45] Date of Patent: Oct. 10, 2000

[54] TERMINAL INSERT FOR A CYCLONE SEPARATOR

[75] Inventors: Wayne Ernest Conrad; Helmut Gerhard Conrad; Ted Szylowiec, all of Hampton, Canada

[73] Assignee: G.B.D. Corp., Cayman, Cayman Islands

[21] Appl. No.: 09/136,176

[22] Filed: Aug. 19, 1998

[51] Int. Cl.[7] ..................................................... B01D 45/12

[52] U.S. Cl. ................................ 55/337; 55/345; 55/399; 55/457; 55/459.1; 55/DIG. 3

[58] Field of Search .......................... 55/337, 345, 459.1, 55/399, 457, 459.3, 472, DIG. 3; 210/512.1

[56] References Cited

U.S. PATENT DOCUMENTS

| | | |
|---|---|---|
| Re. 32,257 | 10/1986 | Dyson . |
| D. 305,269 | 12/1989 | Dyson . |
| D. 343,707 | 1/1994 | Dyson . |
| D. 382,679 | 8/1997 | Dyson . |
| 450,372 | 4/1891 | Morse . |
| 883,413 | 3/1908 | Mahony . |
| 1,023,082 | 4/1912 | Kluge . |
| 1,127,896 | 2/1915 | Keller . |
| 1,369,939 | 3/1921 | Shaffer . |
| 1,752,231 | 3/1930 | Clarkson . |
| 1,798,510 | 3/1931 | Winslow et al. . |
| 1,826,798 | 10/1931 | Lee . |
| 1,897,144 | 2/1933 | Prouty . |
| 2,014,287 | 10/1935 | Newman . |
| 2,143,421 | 1/1939 | Loehr et al. . |
| 2,171,248 | 9/1939 | Van Berkel . |
| 2,392,872 | 1/1946 | Wolfe . |
| 2,397,872 | 4/1946 | Kovacs . |
| 2,397,980 | 4/1946 | Petri . |
| 2,402,845 | 6/1946 | Rodman . |
| 2,405,625 | 8/1946 | Whiton et al. . |
| 2,608,268 | 8/1952 | Gerber . |
| 2,681,124 | 6/1954 | Van der Kolk . |
| 2,822,060 | 2/1958 | Udovich . |
| 2,993,223 | 7/1961 | Krammes . |
| 3,200,568 | 8/1965 | McNeil . |
| 3,235,090 | 2/1966 | Bose et al. . |
| 3,283,480 | 11/1966 | Szego . |
| 3,320,727 | 5/1967 | Farley et al. . |
| 3,425,192 | 2/1969 | Davis . |
| 3,501,014 | 3/1970 | Fitch, Jr. et al. . |
| 3,535,854 | 10/1970 | Taylor . |
| 3,853,518 | 12/1974 | Tu et al. . |
| 3,877,902 | 4/1975 | Eriksson et al. . |

(List continued on next page.)

FOREIGN PATENT DOCUMENTS

| | | |
|---|---|---|
| 54488 | 5/1985 | Canada . |
| 2104136 | 6/1994 | Canada . |
| 2156069 | 6/1996 | Canada . |
| 52195 | 9/1936 | Denmark . |
| 69708 | 1/1949 | Denmark . |
| 762070 | 12/1950 | United Kingdom . |
| WO 96/19293 | 6/1996 | WIPO . |
| WO 96/19294 | 6/1996 | WIPO . |
| WO 96/19936 | 7/1996 | WIPO . |
| WO 96/19937 | 7/1996 | WIPO . |
| WO 96/21389 | 7/1996 | WIPO . |
| WO 96/22726 | 8/1996 | WIPO . |
| 96 27446 | 9/1996 | WIPO . |
| WO 98/02080 | 1/1998 | WIPO . |
| WO 98/10691 | 3/1998 | WIPO . |
| WO 98/23381 | 6/1998 | WIPO . |
| WO 98/27857 | 7/1998 | WIPO . |
| WO 98/33424 | 8/1998 | WIPO . |

*Primary Examiner*—David A. Simmons
*Assistant Examiner*—Minh-Chau T. Pham
*Attorney, Agent, or Firm*—Reed Smith Hazel & Thomas

[57] ABSTRACT

A terminal insert for a cyclone separator for separating a material from a fluid. The terminal insert has a distinct member positioned within the cyclone separator to impinge upon at least a portion of the fluid as it rotates within the cyclone separator to destructively interfere with the rotational motion of the fluid within the cyclone separator.

35 Claims, 11 Drawing Sheets

U.S. PATENT DOCUMENTS 3,925,045 12/1975 Cheng .
3,955,236 5/1976 Mekelburg .
4,005,998 2/1977 Gorman .
4,141,698 2/1979 Kihlstedt et al. .
4,162,149 7/1979 Mekelburg .
4,198,290 4/1980 Summers .
4,251,368 2/1981 Colman et al. .
4,268,288 5/1981 Coombs .
4,289,611 9/1981 Brockmann .............................. 55/345
4,326,862 4/1982 Suzuki .
4,345,572 8/1982 Suzuki et al. .
4,352,681 10/1982 Dietz .
4,373,228 2/1983 Dyson .
4,377,882 3/1983 Dyson .
4,390,426 6/1983 Vicard .
4,394,138 7/1983 Schilling .............................. 55/459.1
4,398,928 8/1983 Kunsagi .
4,443,234 4/1984 Carlsson .
4,571,772 2/1986 Dyson .
4,573,236 3/1986 Dyson .
4,588,423 5/1986 Gillingham et al. .
4,593,429 6/1986 Dyson .
4,643,748 2/1987 Dyson .
4,756,729 7/1988 Brunnmair et al. .
4,826,515 5/1989 Dyson .
4,848,991 7/1989 Bielefeldt .............................. 55/459.1
4,853,008 8/1989 Dyson .
4,853,011 8/1989 Dyson .
5,062,870 11/1991 Dyson .
5,078,761 1/1992 Dyson .
5,080,697 1/1992 Finke .............................. 55/472
5,090,976 2/1992 Dyson .
5,101,532 4/1992 Dyson et al. .
5,145,499 9/1992 Dyson .
5,160,356 11/1992 Dyson .
5,267,371 12/1993 Soler et al. .
5,275,730 1/1994 Keuschnigg .............................. 55/459.1
5,350,432 9/1994 Lee .
5,558,697 9/1996 Dyson et al. .
5,591,253 1/1997 Altman et al. .
5,746,795 5/1998 Witter .............................. 55/337
5,755,007 5/1998 Dyson .

TERMINAL INSERT FOR A CYCLONE SEPARATOR

FIELD OF THE INVENTION

This invention relates to an improved apparatus for separating a component from a fluid stream. In one embodiment, the fluid may be a gas having solid and/or liquid particles and or a second gas suspended, mixed, or entrained therein and the separator is used to separate the particles and/or the second gas from the gas stream. In an alternate embodiment, the fluid may be a liquid which has solid particles, and/or a second liquid and/or a gas suspended, mixed, or entrained therein and the separator is used to remove the solid particles and/or the second liquid and/or the gas from the liquid stream. The improved separator may be used in various applications including vacuum cleaners, liquid/liquid separation, smoke stack scrubbers, pollution control devices, mist separator, an air inlet for a turbine engine and as pre-treatment equipment in advance of a pump for a fluid (either a liquid, a gas or a mixture thereof) and other applications where it may be desirable to remove particulate or material contained in a fluid.

BACKGROUND OF THE INVENTION

Cyclone separators are devices that utilize centrifugal forces and low pressure caused by spinning motion to separate materials of differing density, size and shape. FIG. 1 illustrates the operating principles in a typical cyclone separator (designated by reference numeral 10 in FIG. 1) which is in current use. The following is a description of the operating principles of cyclone separator 10 in terms of its application to removing entrained particles from a gas stream, such as may be used in a vacuum cleaner.

Cyclone separator 10 has an inlet pipe 12 and a main body comprising upper cylindrical portion 14 and lower frusto-conical portion 16. The particle laden gas stream is injected through inlet pipe 12 which is positioned tangentially to upper cylindrical portion 14. The shape of upper cylindrical portion 14, and frusto-conical portion 16 induces the gas stream to spin creating a vortex. Larger or more dense particles are forced outwards to the walls of cyclone separator 10 where the drag of the spinning air as well as the force of gravity causes them to fall down the walls into an outlet or collector 18. The lighter or less dense particles, as well as the gas medium itself, reverses course at approximately collector G and pass outwardly through the low pressure centre of separator 10 and exit separator 10 via gas outlet 20 which is positioned in the upper portion of upper cylindrical portion 14.

The separation process in cyclones generally requires a steady flow free of fluctuations or short term variations in the flow rate. The inlet and outlets of cyclone separators are typically operated open to the atmosphere so that there is no pressure difference between the two. If one of the outlets must be operated at a back pressure, both outlets would typically be kept at the same pressure.

When a cyclone separator is designed, the principal factors which are typically considered are the efficiency of the cyclone separator in removing particles of different diameters and the pressure drop associated with the cyclone operation. The principle geometric factors which are used in designing a cyclone separator are the inlet height (A); the inlet width (B); the gas outlet diameter (C); the outlet duct length (D); the cone height (Lc); the dirt outlet diameter (G); and, the cylinder height (L).

The value $d_{50}$ represents the smallest diameter particle of which 50 percent is removed by the cyclone. Current cyclones have a limitation that the geometry controls the particle removal efficiency for a given particle diameter. The dimensions which may be varied to alter the d50 value are features (A)–(D), (G), (L) and (Lc) which are listed above.

Typically, there are four ways to increase the small particle removal efficiency of a cyclone. These are (1) reducing the cyclone diameter; (2) reducing the outlet diameter; (3) reducing the cone angle; and (4) increasing the body length. If it is acceptable to increase the pressure drop, then an increase in the pressure drop will (1) increase the particle capture efficiency; (2) increase the capacity and (3) decrease the underflow to throughput ratio.

In terms of importance, it appears that the most important parameter is the cyclone diameter. A smaller cyclone diameter implies a smaller $d_{50}$ value by virtue of the higher cyclone speeds and the higher centrifugal forces which may be achieved. For two cyclones of the same diameter, the next most important design parameter appears to be L/d, namely the length of the cylindrical section 14 divided by the diameter of the cyclone and Lc/d, the length of the conical section 16 divided by the width of the cone. Varying L/d and Lc/d will affect the $d_{50}$ performance of the separation process in the cyclone.

Typically, the particles which are suspended or entrained in a gas stream are not homogeneous in their particle size distribution. The fact that particle sizes take on a spectrum of values often necessitates that a plurality of cyclonic separators be used in a series. For example, the first cyclonic separator in a series may have a large $d_{50}$ specification followed by one with a smaller $d_{50}$ specification. The prior art does not disclose any method by which a single cyclone may be tuned over the range of possible $d_{50}$ values.

An example of the current limitation in cyclonic separator design is that which has been recently applied to vacuum cleaner designs. In U.S. Pat. Nos. 4,373,228; 4,571,772; 4,573,236; 4,593,429; 4,643,748; 4,826,515; 4,853,008; 4,853,011; 5,062,870; 5,078,761; 5,090,976; 5,145,499; 5,160,356; 5,255,411; 5,358,290; 5,558,697; and RE 32,257, a novel approach to vacuum cleaner design is taught in which sequential cyclones are utilized as the filtration medium for a vacuum cleaner. Pursuant to the teaching of these patents, the first sequential cyclone is designed to be of a lower efficiency to remove only the larger particles which are entrained in an air stream. The smaller particles remain entrained in the gas stream and are transported to the second sequential cyclone which is frusto-conical in shape. The second sequential cyclone is designed to remove the smaller particles which are entrained in the air stream. If larger particles are carried over into the second cyclone separator, then they will typically not be removed by the cyclone separator but exit the frusto-conical cyclone with the gas stream.

Accordingly, the use of a plurality of cyclone separators in a series is documented in the art. It is also known how to design a series of separators to remove entrained or suspended material from a fluid stream. Such an approach has two problems. First, it requires a plurality of separators. This requires additional space to house all of the separators and, secondly additional material costs in producing each of the separators. The second problem is that if any of the larger material is not removed prior to the fluid stream entering the next cyclone separator, the subsequent cyclone separator typically will allow such material to pass therethrough as it is only designed to remove smaller particles from the fluid stream.

In cyclone separators, substantial rotational velocities are achieved, particularly in separators designed to remove finer particles from a fluid stream. In some applications, such rotational velocities may re-entrain separated material if it impinges upon the separated material. For example, if the cyclone separator is vertically disposed and designed to remove solid particulate matter from a fluid stream, some of the separated particulate matter may accumulate at the bottom of the cyclone separator. If the fluid stream impinges upon this separated material, it may re-entrain some of the separated particulate.

SUMMARY OF THE PRESENT INVENTION

In accordance with the instant invention, there is provided a terminal insert for a cyclone separator for separating a material from a fluid, the separator having a longitudinally extending body and a wall, the wall having an inner surface and defining an internal cavity having an outer portion in which the fluid rotates when the separator is in use and an inner portion, the terminal insert comprising a distinct member positioned within the longitudinally extending body to impinge upon at least a portion of the fluid as it rotates within the cavity to destructively interfere with the rotational motion of the fluid within the cavity.

In accordance with the instant invention, there is also provided a terminal insert for a cyclone separator for separating a material from a fluid, the separator having a longitudinally extending body and a wall, the wall having an inner surface and defining an internal cavity in which the fluid rotates in a cyclonic pattern when the separator is in use, the terminal insert comprising a member having an outer wall spaced from the inner surface and configured to impart changes in the rate of acceleration to at least a portion of the fluid as it rotates within the cavity to reduce the rotational momentum of the fluid to the point where the fluid has insufficient momentum to maintain a cyclonic flow in the separator.

In accordance with the instant invention, there is also provided a cyclone separator for separating a material from a fluid comprising:

(a) a longitudinally extending body having a wall and defining a longitudinal axis, the wall having an inner surface which defines an internal cavity having an outer portion in which the fluid rotates when the separator is in use and an inner portion; and, (b) a terminal insert comprising a member having an outer wall spaced from the inner surface and positioned to interact with at least a portion of the fluid as it rotates in the cuter portion of the cavity to destructively interfere with the rotational motion of the fluid within the cavity.

In one embodiment the outer wall of the terminal insert interacts with the portion of the fluid to impart to the portion of the fluid a different speed, a different direction of travel or a different velocity compared to that of the fluid rotating in the outer portion of the cavity.

In another embodiment, at least a portion of the outer wall is configured to continuously impart changes in the rate of acceleration to the fluid as it rotates within the cavity.

In another embodiment, the terminal insert is centrally positioned within the cavity and extends outwardly to impinge upon the portion of the fluid.

In another embodiment, the outer wall of the terminal insert is configured to create an area in the cavity wherein the fluid is travelling at a velocity insufficient to maintain the rotational motion of the fluid within the cavity. The area may have a receiving portion for receiving the material which is separated from the fluid. Alternately, the separator may be vertically disposed and the receiving portion is positioned towards the lower end of the separator and comprises a collecting chamber in which the separated material is collected. Further, the separator may be vertically disposed and the receiving portion is positioned towards the lower end of the separator and is in flow communication with a collecting chamber in which the separated material is collected.

In another embodiment, at least a portion of the inner surface of the wall is defined by a continuous n-differentiable curve swept 360 degrees around the axis wherein $n \geqq 2$ and the second derivative is not zero everywhere.

In another embodiment, at least a portion of the inner surface of the wall is defined by a plurality of straight lines which approximate a continuous n-differentiable curve swept 360 degrees around the axis wherein $n \geqq 2$ and the second derivative is not zero everywhere.

In another embodiment, the internal cavity has, in transverse section, an inner portion in which the fluid rotates when the separator is in use and at least one outer portion positioned external to the inner portion and contiguous therewith, the outer portion of the cavity extending outwardly from the inner portion of the cavity and defining a zone in which at least a portion of the fluid expands outwardly as it rotates in the plane defined by the transverse section, the portion of the fluid in the outer portion of the cavity having different fluid flow characteristics compared to those of the fluid rotating in the inner portion of the cavity which promote the separation of the material from the fluid.

In another embodiment, in transverse section, the wall extends in a continuous closed path and has a non-baffled inner surface which defines an internal cavity, the internal cavity having an inner portion in which the fluid rotates when the separator is in use, and at least one outer portion positioned external to the inner portion and contiguous therewith defining a zone in which the wall is configured to impart to at least a portion of the fluid as it rotates in the plane defined by the transverse section different fluid flow characteristics compared to those of the fluid rotating in the inner portion of the cavity, which characteristics promote the separation of the material from the fluid.

In another embodiment, the inner surface of the wall is defined by, in transverse section, a continuous non-circular convex closed path, the cavity having an inner portion positioned within the non-circular convex closed path and at least one outer portion between the inner portion and the non-circular convex closed path.

The separator may comprise a dirt filter for a vacuum cleaner, an air inlet for turbo machinery, treatment apparatus positioned upstream of a fluid pump, treatment apparatus positioned upstream of a pump for a gas or treatment apparatus positioned upstream of a pump for a liquid.

By designing a cyclone separator according to the instant invention, the parameters L/d and Lc/d may be constant or may vary continuously and differentiably along the length of the cyclone axis with substantial re-entrainment and, preferably without any re-entrainment, of separated material. Thus, a cyclone may be designed which will have a good separation efficiency over a wider range of particle sizes than has heretofore been known. Accordingly, one advantage of the present invention is that a smaller number of cyclones may be employed in a particular application than have been used in the past. It will be appreciated by those skilled in the art that where, heretofore, two or more cyclones might have been required for a particular application, that only one cyclone may be required. Further, whereas in the past three to four cyclones may have been required, by using the separator of the instant intention, only two cyclones may be required. Thus, in one embodiment of the instant invention, the cyclone separator may be designed for a vacuum cleaner and may in fact comprise only a single cyclone as opposed to a multi-stage cyclone as is known in the art.

DESCRIPTION OF THE DRAWING FIGURES

These and other advantages of the instant invention will be more fully and completely understood in accordance with the following description of the preferred embodiments of the invention in which.

Figure 14:
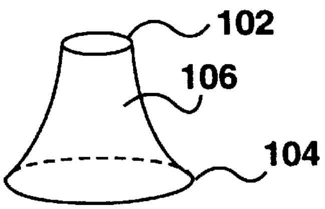
Figure 14:
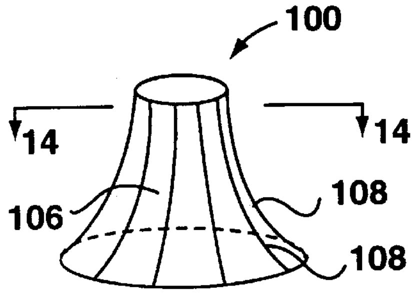
Figure 14:
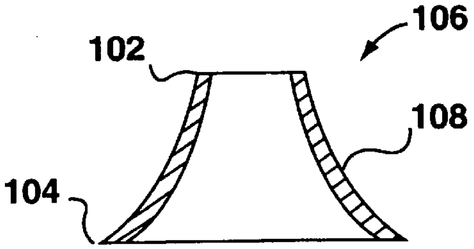
Figure 14:
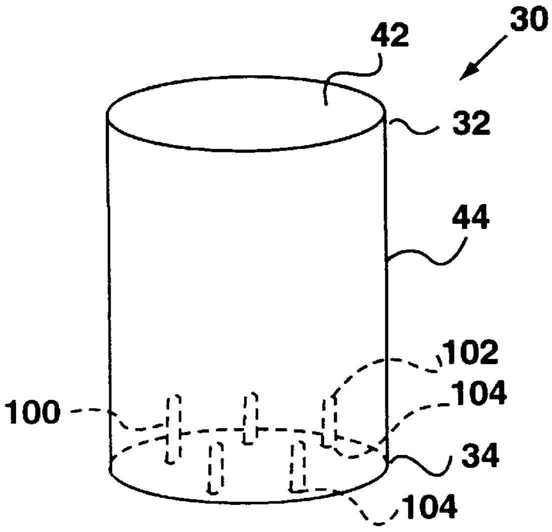
Figure 14:
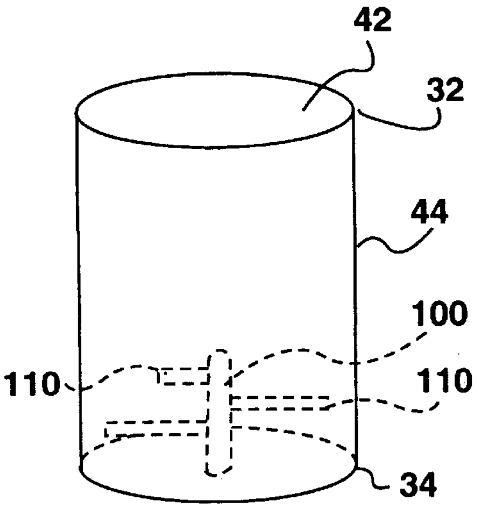

FIGS. 14(*a*), (*b*), (*d*), and (*e*) are each an alternate embodiment of the terminal insert according to the instant invention; and, FIGS. 14(*c*) is a cross sectional view along line 14—14 in FIG. 14(*b*).

DESCRIPTION OF PREFERRED EMBODIMENT

As shown in FIGS. 2–10, cyclone separator 30 may comprises a longitudinally extending body having a top end 32, a bottom end 34, fluid inlet port 36, a fluid outlet port 38 and a separated material outlet 40.

Figure 1:
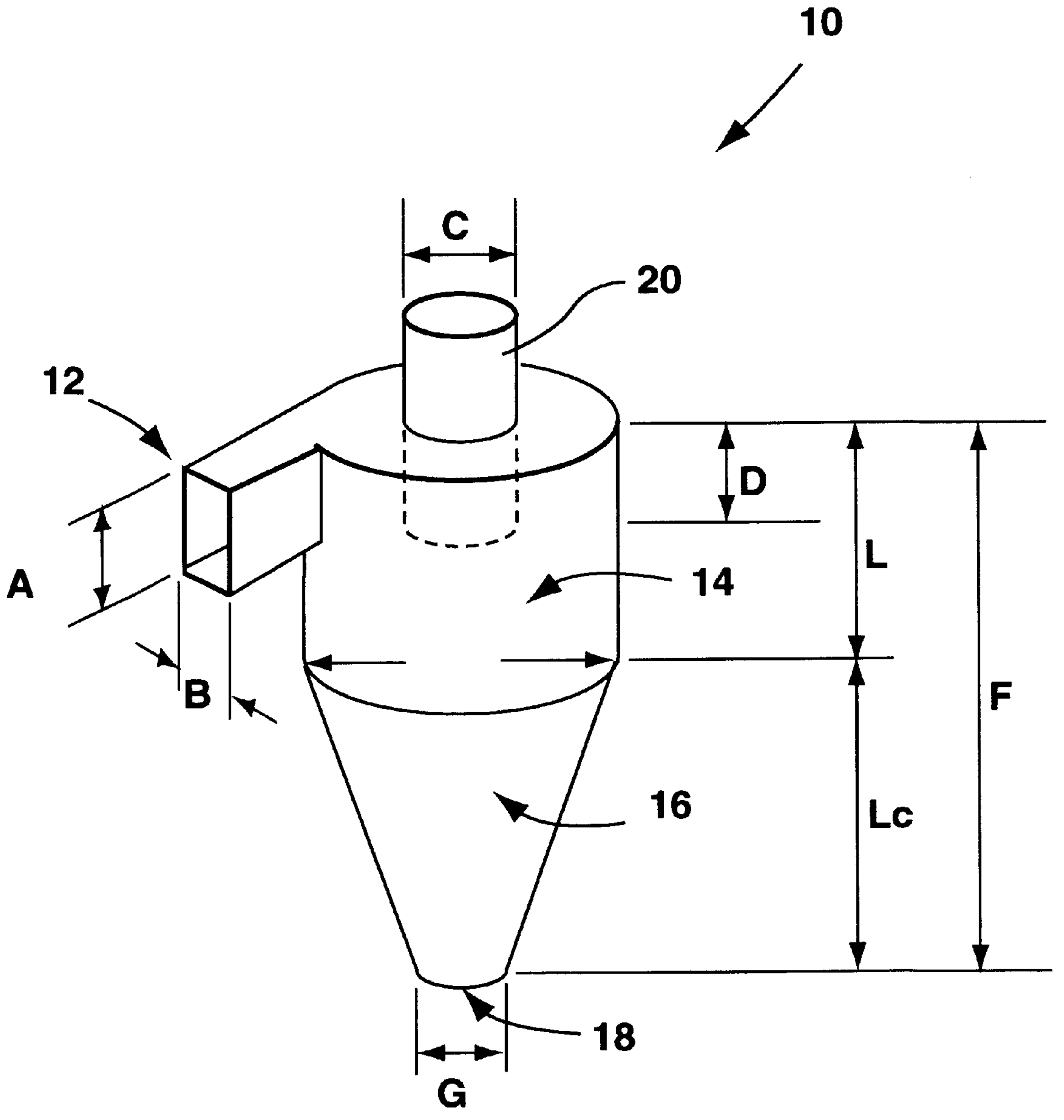
FIG. 1 is a cyclone separator as is known in the art.
Figure 3:
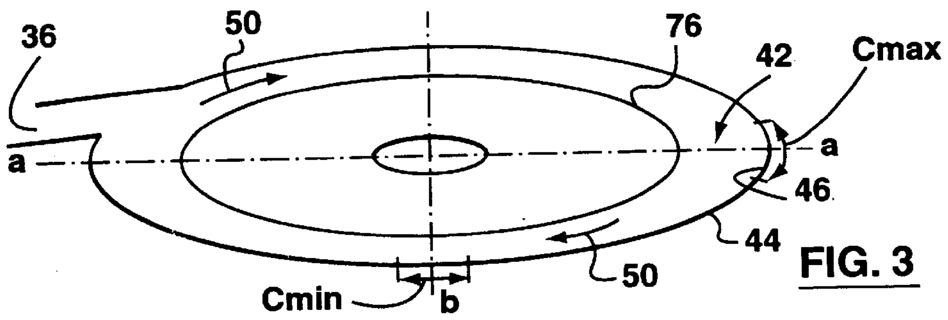
FIG. 3 is a cross-section of the cyclone separator of FIG. 2 taken along the line 3—3.
Figure 2:
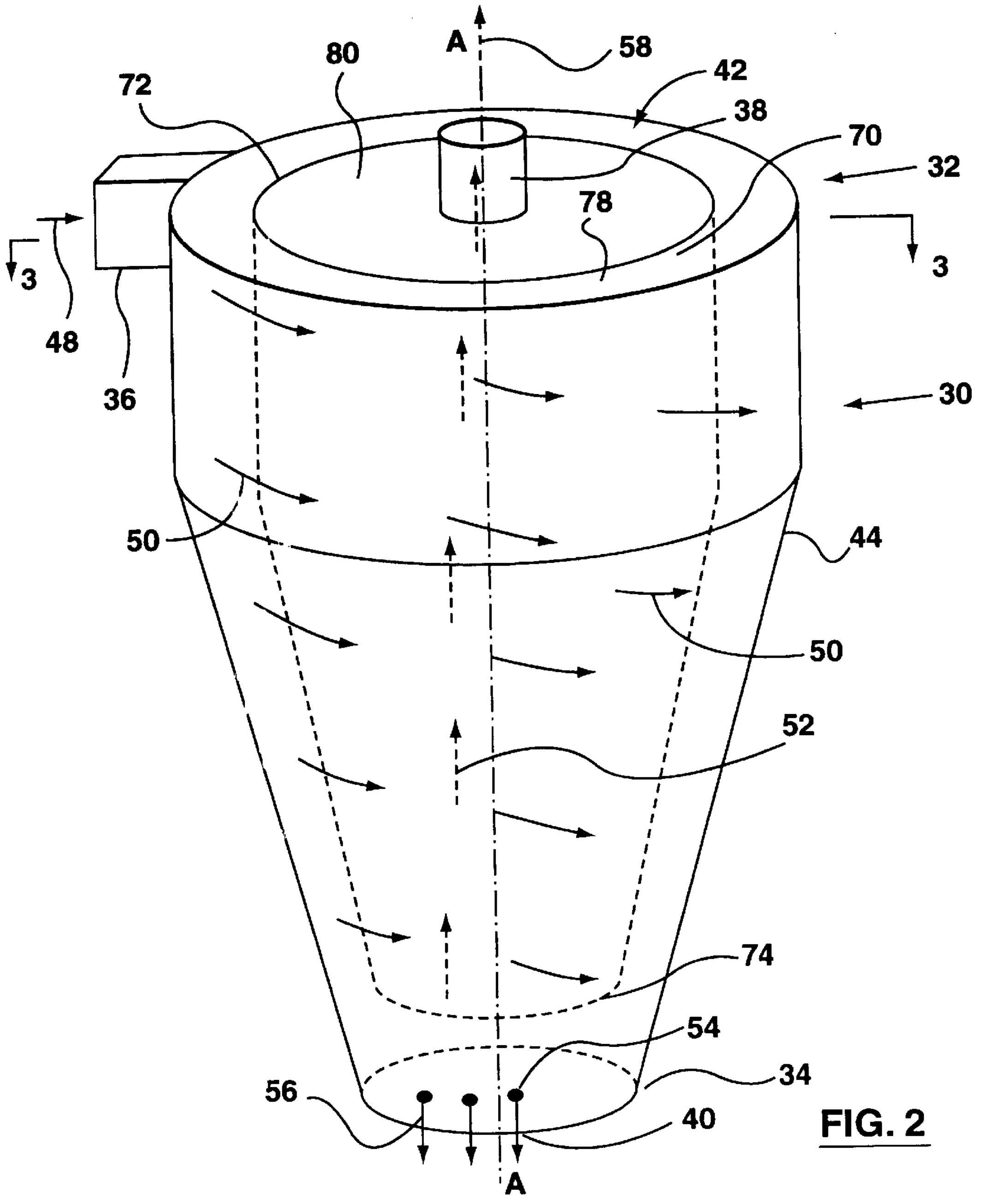
FIG. 2 is a perspective view of a cyclone separator according to the instant invention.
Figure 11:
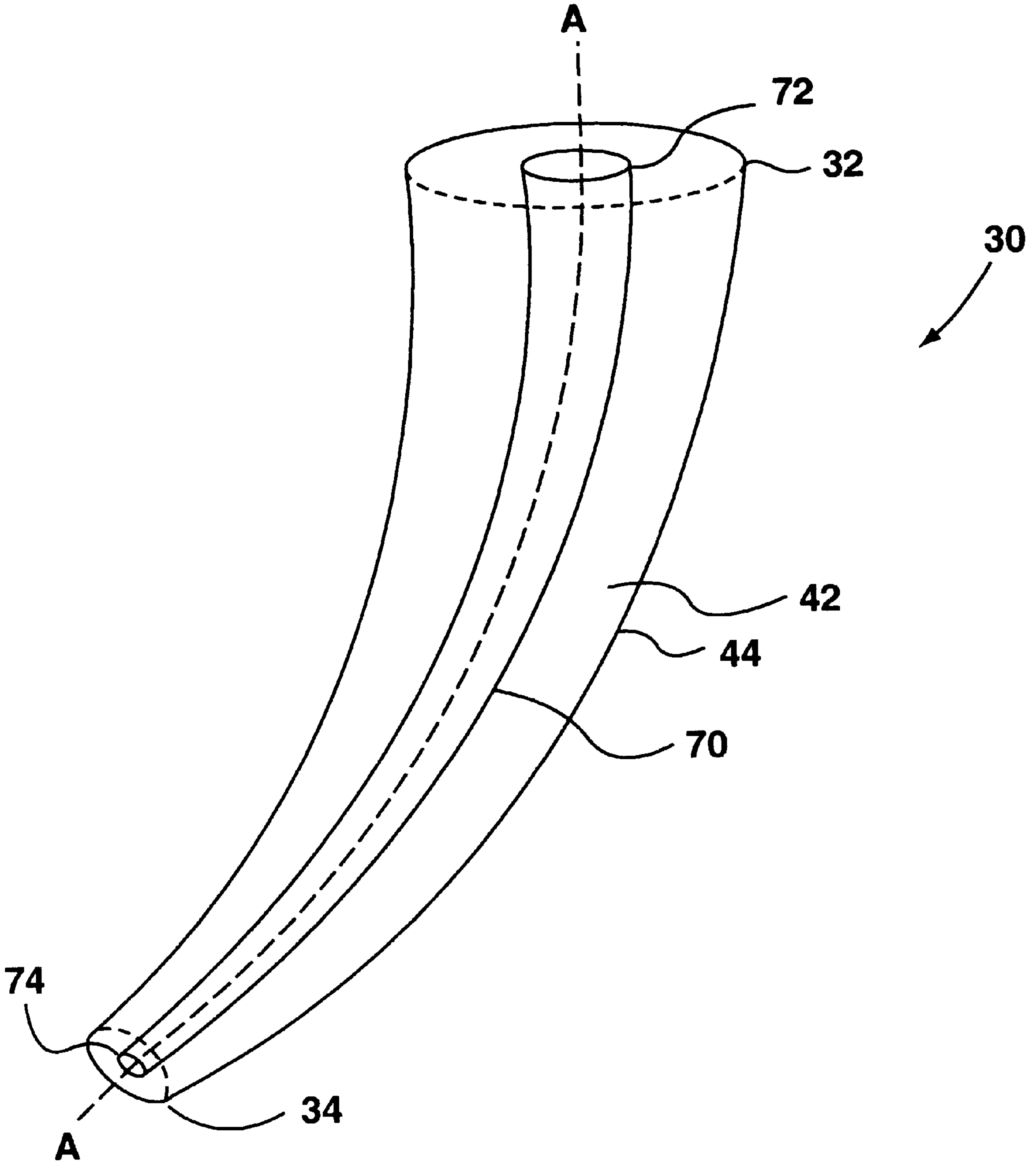

Cyclone separator 30 has a wall 44 having an inner surface 46 and defining a cavity 42 therein within which the fluid rotates. Cyclone separator 30 has a longitudinally extending axis A—A which extends centrally through separator 30. Axis A—A may extend in a straight line as shown in FIG. 2 or it may be curved or serpentine as shown in FIG. 11.

As shown in FIGS. 2, 4, 5, 7, 8, 9 and 10, cyclone separator 30 is vertically disposed with the fluid and material to be separated entering cyclone separator 30 at a position adjacent top end 32. As shown in FIG. 6, cyclone separator 30 is again vertically disposed but inverted compared to the position show in FIGS. 2, 4, 5, 7, 8, 9 and 10. In this embodiment, fluid 48 enters cyclone separator 30 at a position adjacent bottom end 34 of the separator. It will be appreciated by those skilled in the art that provided the inlet velocity of fluid 48 is sufficient, axis A—A may be in any particular plane or orientation, such as being horizontally disposed or inclined at an angle.

Fluid 48 may comprise any fluid that has material contained therein that is capable of being removed in a cyclone separator. Fluid 48 may be a gas or a liquid. If fluid 48 is a gas, then fluid 48 may have solid particles and/or liquid particles and/or a second gas contained therein such as by being suspended, mixed or entrained therein. Alternately, if fluid 48 is a liquid, it may have solid particles and/or a second liquid and/or a gas contained therein such as by being suspended, mixed or entrained therein. It will thus be appreciated that the cyclone separator of the instant invention has numerous applications. For example, if fluid 48 is a gas and has solid particles suspended therein, then the cyclone separator may be used as the filter media in a vacuum cleaner. It may also be used as a scrubber for a smoke stack so as to remove suspended particulate matter such as fly ash therefrom. It may also be used as pollution control equipment, such as for a car, or to remove particles from an inlet gas stream which is fed to turbo machinery such as a turbine engine.

If fluid 48 is a gas and contains a liquid, then cyclone separator 30 may be used as a mist separator.

If fluid 48 is a mixture of two or more liquids, then cyclone separator 30 may be used for liquid/liquid separation. If fluid 48 is a liquid and has a gas contained therein, then cyclone separator 30 may be used for gas/liquid separation. If fluid 48 is a liquid which has solid particles contained therein, then cyclone separator 30 may be used for drinking water or waste water purification.

In the embodiment shown in FIG. 2, wall 44, in transverse section, is in the shape of an ellipse. In the embodiment shown in FIG. 4, wall 44 has a trumpet shape. Such shapes may be prepared by sweeping a continuous n-differentiable curve 360° around axis A—A wherein n is $\geqq 2$ and the second derivative is not zero everywhere. Preferably, n is $\geqq 2$ and $\leqq 1{,}000$, more preferably $n \leqq 100$ and most preferably $n \leqq 10$. If the second derivative is zero at a finite number of points, then it may be zero from about 2 to 100 points, preferably from about 2 to about 30 points and, more preferably, at 2 to 10 points.

Fluid 48 enters cyclone separator through inlet port 36 and tangentially enters cavity 42. Due to the tangential entry of fluid 48 into cavity 42, fluid 48 is directed to flow in a cyclonic pattern in cavity 42 in the direction of arrows 50. Fluid 48 travels in the axial direction in cavity 42 from fluid entry port 36 to a position adjacent bottom end 34. At one point, the fluid reverses direction and flows upwardly in the direction of arrows 52 while material 54 becomes separated from fluid 48 and falls downwardly in the direction of arrows 56. Treated fluid 58, which has material 54 separated therefrom, exits cyclone separator 30 via outlet port 38 at the top end 32 of cavity 42.

Figure 7:
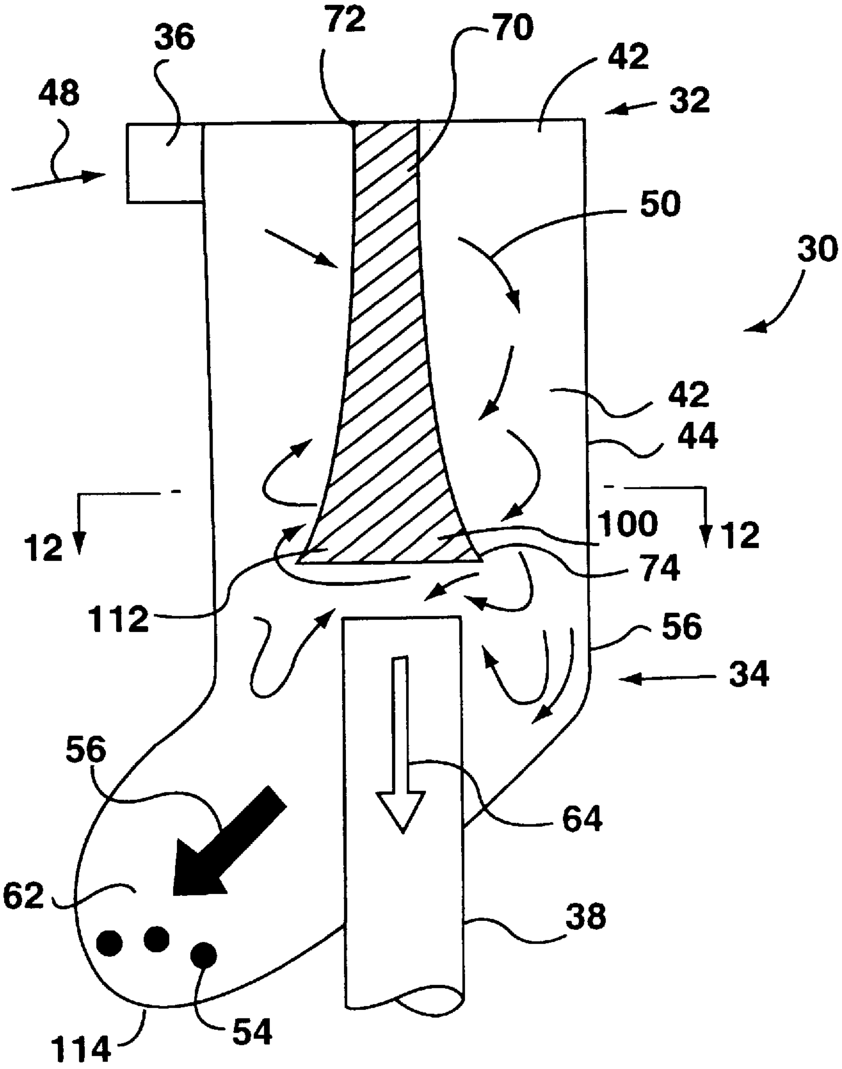
Figure 8:
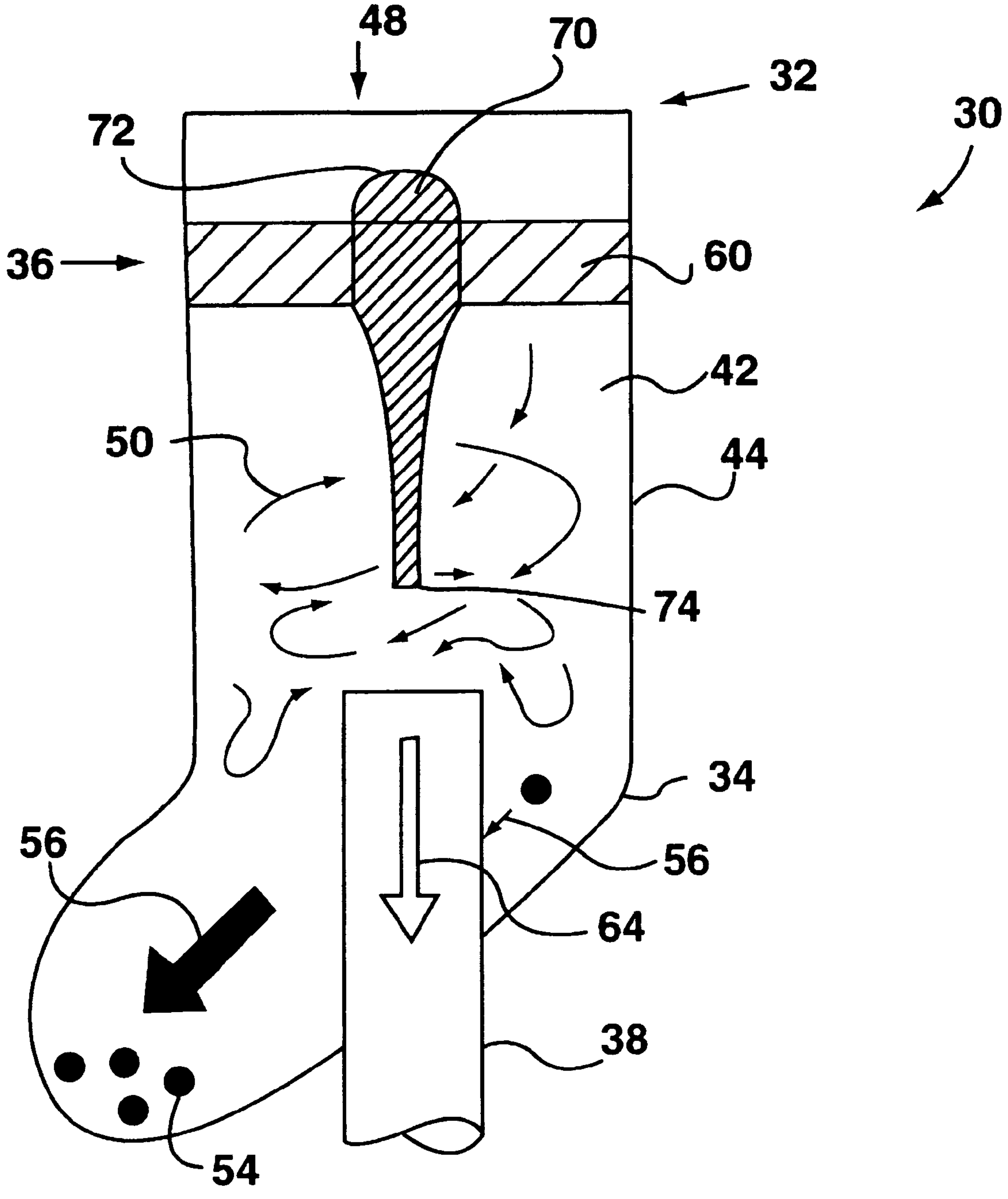
Figure 9:
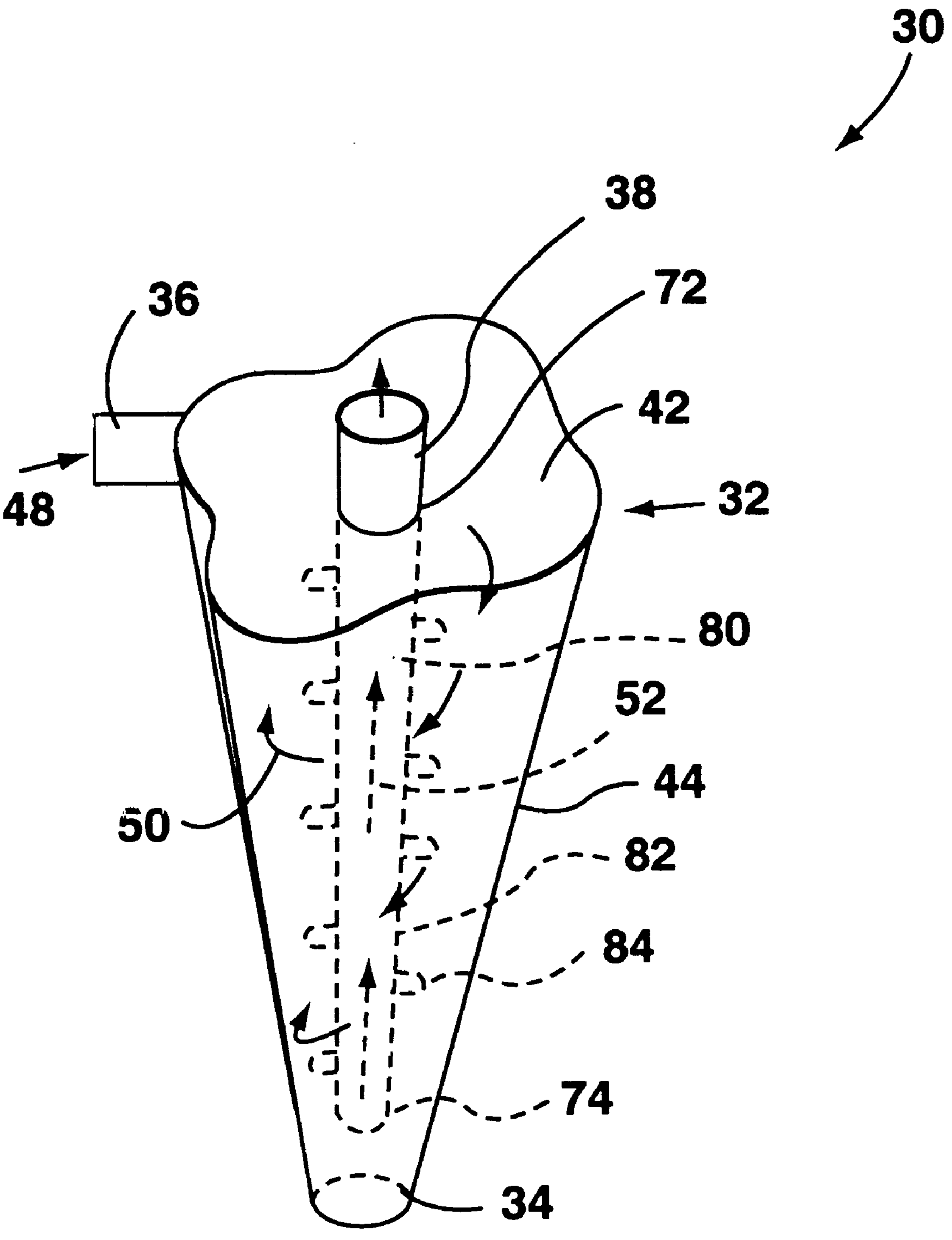

In the alternate embodiment shown in FIGS. 7 and 8, cyclone separator 30 may be a unidirectional flow cyclone separator. The cyclone separator operates in the same manner as described above with respect to the cyclone separator 30 shown in FIG. 2 except that fluid 48 travels continuously longitudinally through cavity 42. Material 54 becomes separated from fluid 48 and travels downwardly in the direction of arrows 56. Treated fluid 64, which has material 54 separated therefrom, continues to travel downwardly and exits cyclone separator 30 via outlet port 38 at a position below bottom end 34 of cavity 42.

As exemplified in the FIGS. 2–10, cyclone separator may have a variety of shapes. In particular, cyclone separator may have an outer rotational wall 44 which is of any shape known in the industry. For example, outer wall 44 may be either cylindrical (see for example FIGS. 12(*a*)–(*h*)) or frusto-conical in shape.

In one embodiment, cavity 42 has an inner portion in which fluid rotates as it travel longitudinally in cyclone separator 30 and an outer portion exterior thereto but contiguous therewith. The outer portion of cavity 42 may extend outwardly from the inner portion of the cavity to define a zone in which at least a portion of fluid 48 expands outwardly as it rotates in a plane defined by the transverse section whereby the portion of the fluid in the outer portion of cavity 42 has different fluid flow characteristics compared to those of fluid 48 rotating in the inner portion of cavity 42 which promote the separation of the material from the fluid. Such a configuration for wall 44 of cavity 42 is disclosed in co-pending application Ser. No. 09/136,366 entitled CYCLONE SEPARATOR HAVING A VARIABLE TRANSVERSE PROFILE filed concurrently herewith, all of which is incorporated herein by reference.

Alternately, outer wall 44 of cavity 42 may be in the shape of a continuous n-differentiable curve wherein n is ≧2 and the second differential is not zero everywhere, swept 360° around the longitudinal axis of cavity 42 (see for example FIGS. 22(*a*)–(*h*)). Such a configuration of outer wall 44 of cavity 42 is disclosed in co-pending application Ser. No. 09/136,367 entitled CYCLONE SEPARATOR HAVING A VARIABLE LONGITUDINAL PROFILE filed concurrently herewith, all of which is incorporated herein by reference.

Figure 5:
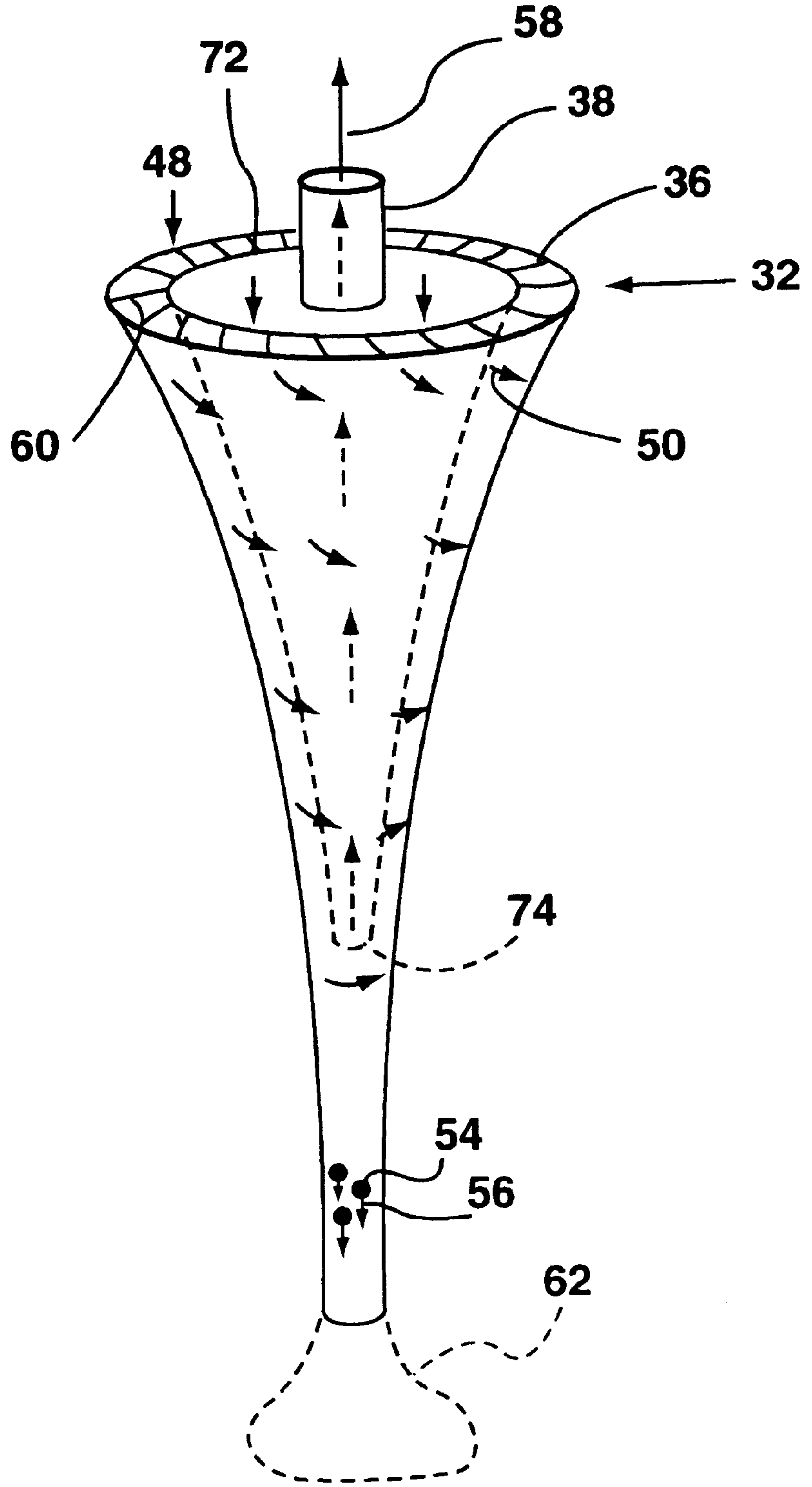
Figure 6:
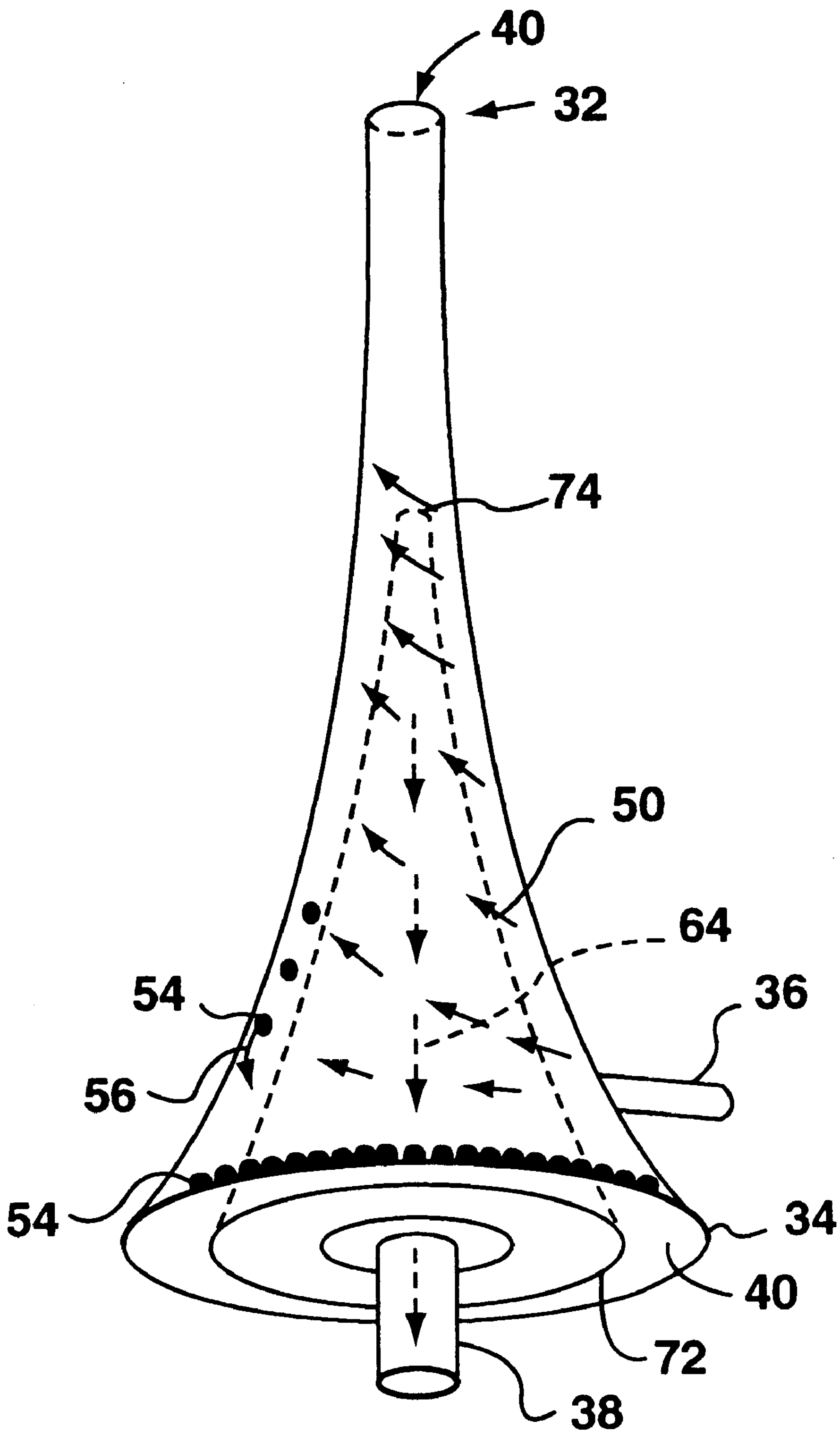
Figure 10:
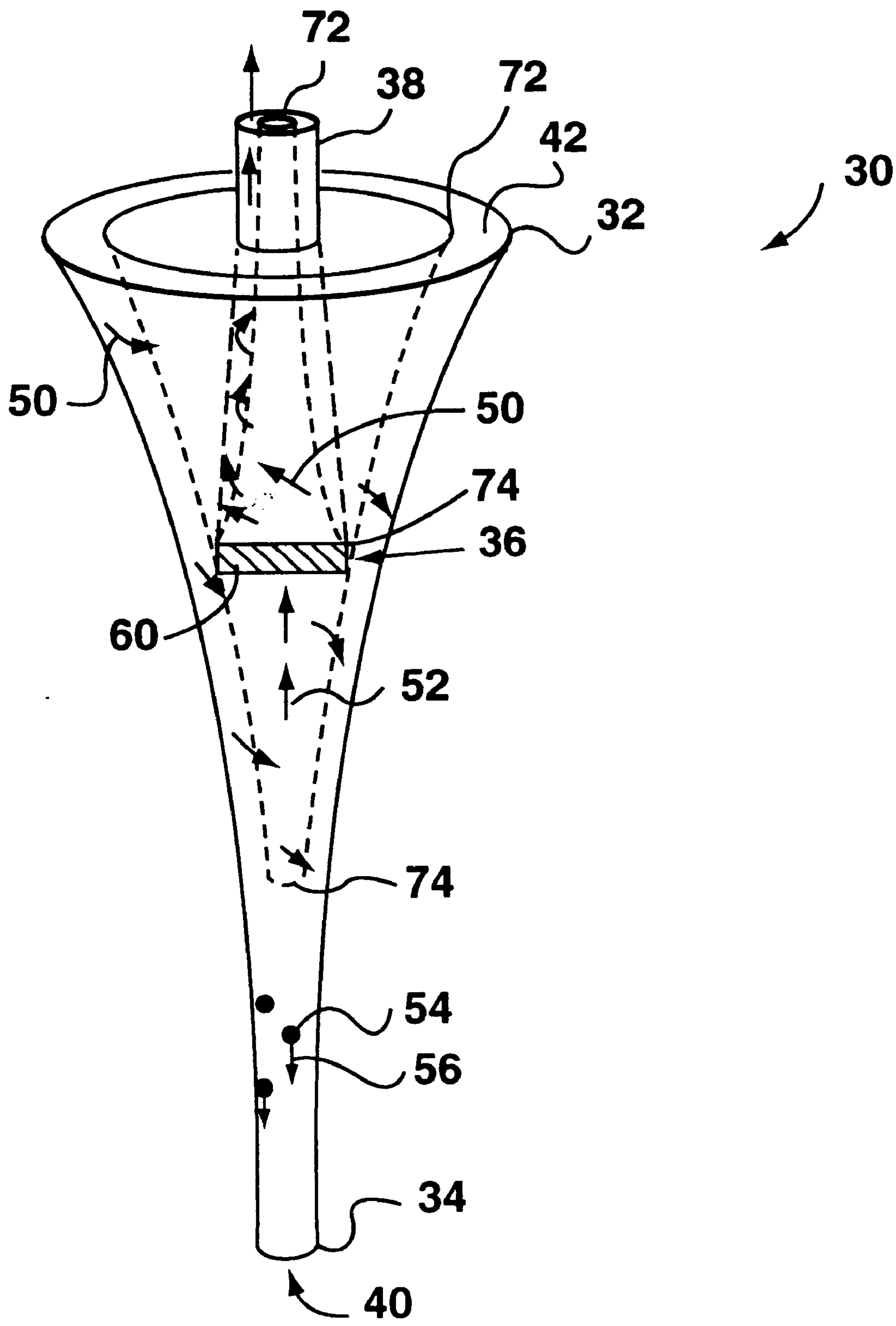

As shown in FIGS. 5, 8 and 10, fluid 48 may enter cavity 42 axially. In such a case, fluid entry port 36 is provided, for example, at top end 32 of cyclone separator 30. A plurality of vanes 60 are provided to cause fluid 48 to flow or commence rotation within cavity 42. It would be appreciated by those skilled in the art that fluid 48 may enter cavity 48 from any particular angle provided that fluid entry port 36 directs fluid 48 to commence rotating within cavity 42 so as to assist in initiating or to fully initiate, the cyclonic/swirling motion of fluid 48 within cavity 42.

Referring to FIG. 6, cyclone separator 30 is vertically disposed with fluid entry port 36 positioned adjacent bottom end 34. As fluid 48 enters cavity 42, it rises upwardly and is subjected to a continuously varying acceleration along inner surface 46 of cavity 42. Gravity will tend to maintain the contained material (if it is heavier) in the acceleration region longer thereby enhancing the collection efficiency. At some point, the air reverses direction and flows downwardly in the direction of arrow 64 through exit port 38. Particles 54 become separated and fall downwardly to bottom end 34 of cyclone separator 30. If bottom end 34 is a contiguous surface, then the particles will accumulate in the bottom of cyclone separator 30. Alternately, opening 40 may be provided in the bottom surface of cyclone separator 30 so as to permit particles 54 to exit cyclone separator 30.

Figure 4:
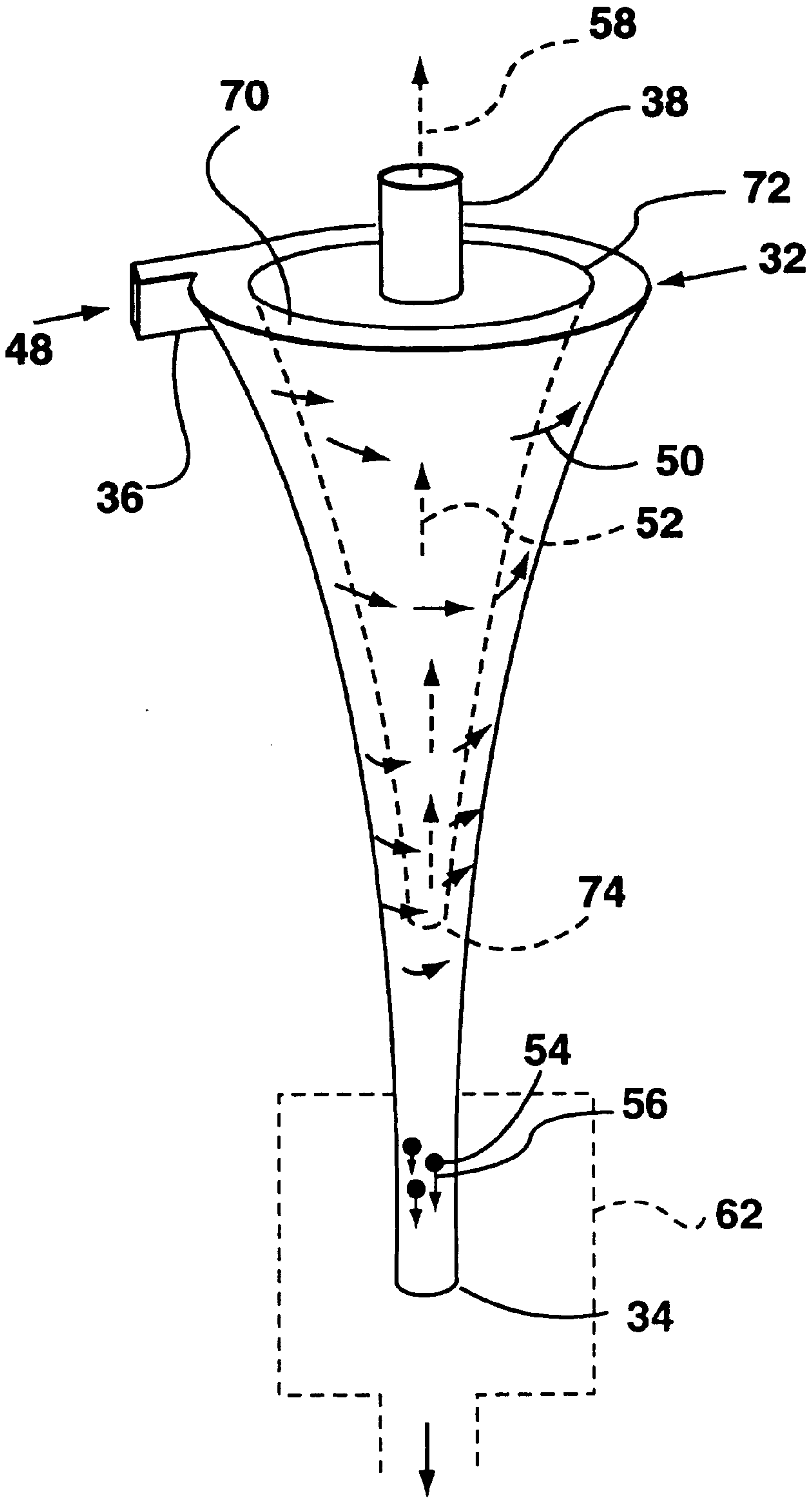
FIGS. 4–11 are each alternate embodiments of the cyclone separator of FIG. 2.

It will also be appreciated that cyclone separator 30 may have a portion thereof which is designed to accumulate separated material (for example, if the bottom surface of the cyclone separator FIG. 6 were sealed) or, if the bottom of cyclone separator 30 of FIG. 5 had a collection chamber 62 (which is shown in dotted outline) extend downwardly from outlet 40. Alternately, outlet 40 may be in fluid communication with a collection chamber 62. For example, as shown in FIG. 4, collection chamber 62 is positioned at the bottom of and surrounds outlet 40 so as to be in fluid communication with cyclone separator 30. Collection chamber 62 may be of any particular configuration to store separated material (see FIGS. 7 and 8) and/or to provide a passage by which separated material 54 is transported from cyclone separator downstream (see FIG. 4) provided it does not interfere with the rotational flow of fluid 48 in cavity 42.

An insert 70 may be positioned within cavity 42. In such a case, insert 70 may have an upstream end 72, a downstream end 74 and a wall 76 extending between upstream end 72 and downstream end 74. Wall 76 has an outer surface 78. In one embodiment, insert 70 may be hollow and have an inner cavity 80. This particular configuration is advantageous if cyclone separator 30 is a reverse flow separator as shown in FIG. 2 whereby fluid 48, after material 54 has been separated therefrom, travels upwardly through cavity 80 of insert 70 to fluid outlet port 38. It will be appreciated that if cyclone separator 30 is a unidirectional flow separator as shown in FIGS. 7 and 8, that insert 70 may be a closed or a solid member.

Insert 70 is a distinct member positioned within cavity 42 to imping upon at least a portion fluid 48 as it rotates within cavity 42 thereby changing the speed, the direction of travel or the velocity of the fluid and causing some of the material contained in fluid 48 to be separated from fluid 48. It will be appreciated that insert 70 does not imping upon fluid 48 to a degree whereby the cyclonic motion of fluid 48 in cavity 42 is prevented. Instead, insert 70 impinges to a sufficient degree to cause at least some of the contained material to be separated from fluid 48 while still permitting fluid 48 to maintain sufficient momentum to continue its rotational motion within cavity 42.

When fluid 48 rotates in a cyclonic pattern within cavity 42, it will rotate only in the outer portion of cavity 42. The inner portion of cavity 42 will comprise a low pressure area where fluid 48 is stagnant or, in the case of a reverse flow cyclone, fluid 48 is travelling upwardly through the dead air space in the centre of cavity 42. Insert 70 may be mounted (e.g. from above or from below cyclone separator 30) within this inner portion and extend radially outwardly from the inner portion so as to interact with at least a portion of fluid 48 as it rotates in the outer portion of cavity 42 to impart to the portion of the fluid with which it interacts different fluid flow characteristics compared to those of fluid 48 rotating in the outer portion of cavity 42 which promote the separation of the material from the fluid. For example, insert 70 may interact with fluid 48 to impart to at least a portion of fluid 48 a different speed, a different direction of travel or a different velocity compared to that of fluid 48 rotating in the outer portion of cavity 42.

Preferably, outer wall 76 of inset 70 is spaced from inner surface 46 and is configured to impart changes, and more preferably to impart continuous changes, in the rate of acceleration to at least a portion of fluid 48 as it rotates within cavity 42 causing some of the material to be separated from fluid 48.

In order to allow cyclone separator 30 to achieve a good separation efficiency over a wider range of small particle sizes, wall 76 is configured to impart changes in one or more of the speed, direction of travel, velocity and the rate of acceleration of fluid 48 as it rotates within cavity 42. By allowing fluid 48 to be subjected to such varying fluid flow characteristics, different size particles may be separated from fluid 48 at different portions along the path of travel of fluid 48 in cavity 42.

In one embodiment, insert 70 may be configured to impart changes to the rate of acceleration of fluid 48 as it travels longitudinally through cavity 42. Alternately, or in addition, insert 70 may be configured to impart changes in the rate of acceleration of fluid 48 as it travels transversely around wall 44.

For example, if the rate of acceleration continually increases along the length of cyclone separator 30, as would be the case of FIG. 4, continuously finer particles would be separated as the fluid proceeds from the top end 32 to bottom end 34. A boundary or prendtl layer which exists along inner surface 46 of wall 44 and outer surface 78 of wall 76 provides low flow or low velocity zones within which the separated material may settle and not become re-entrained by the faster moving air rotating within cavity 42. As fluid 48 travels downwardly through the cyclone separator shown in FIG. 4, the contained material, which for example may have a higher density then that of the fluid, would be subjected to continuously increasing acceleration and would be separated from the fluid and travel downwardly along inner surface 46 of wall 44 and outer surface 78 of wall 76 in the boundary or prendtl layer. As the fluid travels further downwardly through cyclone separator 30, the fluid would be accelerated still more. Thus, at an intermediate level of cyclone separator 30 of FIG. 4, fluid 48 would be travelling at an even greater rate of speed compared to the top end 32 resulting in even finer contained material becoming separated. This effect would continue as fluid 48 rotates around inner surface 46 to bottom end 34.

In another embodiment, the acceleration may continually decrease throughout the length of cyclone separator 30. In another embodiment, the acceleration may vary between continuously increasing and continuously decreasing along the length of cyclone separator 30.

In the embodiment shown in FIG. 2, fluid 48 is subjected to changes in its rate of acceleration as it travels transversely around wall 44. As shown in FIG. 2, cavity 42 and insert 70 are elliptical in transverse section and have a major axis a—a and a minor axis b—b. The portion of maximum curvature of inner surface 46 and outer surface 78 in the transverse plane is denoted by $C_{max}$ and the portion of minimum curvature of inner surface 46 and outer surface 78 in the transverse plane is denoted by $C_{min}$. By allowing fluid 48 to be subjected to varying acceleration as it rotates in the transverse plane, different size particles may be separated from fluid 48 at different portions along the circumference of cyclone separator 30. For example, the acceleration of fluid 48 would increase along sector $C_{max}$ of cyclone separator 30 and particles having a different density would be separated at this portion of the circumference. Similarly, for example, the acceleration of fluid 48 would decrease along sector $C_{min}$ of cyclone separator 30 and particles having a different density would be separated at this portion of the circumference. A boundary or prandtl layer which exists along inner surface 46 of wall 44 and outer surface 78 of wall 76 provides a low flow or a low velocity zone within which the separated material may settle and not become re-entrained by the faster moving air rotating within cavity 42.

Increasing the diameter of insert 70 decelerates the fluid. The contained material, which has a different density to the fluid would therefore change velocity at a different rate then the fluid. For example, if the contained material comprised particles which had a higher density, they would decelerate at a slower rate then fluid 48 and would therefore become separated from fluid 48. As the space between inner surface 46 and outer surface 78 widens, fluid 48 would accelerate. Once again, the denser particles would be slower to change speed and would be travelling at a slower rate of speed than fluid 48 as fluid 48 enters the wider portion of cavity 42 thus again separating the solid particles from fluid 48. It would be appreciated that if the particles where less dense then fluid 48, they would also be separated by this configuration of insert 70.

If fluid 48 comprises a mixture of two fluids which are to be separated, it is particularly advantageous to include in insert 70 at least one portion which is configured to decrease the rate of acceleration of fluid 48 as it passes through that portion of the separator. In this configuration, the less dense fluid would decrease its velocity to follow the contours of outer surface 78 more rapidly then the denser fluid (which would have a higher density), thus assisting in separating the less dense fluid from the more dense fluid.

In one embodiment, at least a portion of inner surface 46 and a portion of outer surface 78 are the same and, more preferably, inner surface 46 and outer surface 78 are of a similar shape, but spaced apart, for the entire length of insert 70 (see FIGS. 2–6). Preferably, any point on outer surface 78 is at least 0.1 inches from inner surface 46 and, most preferably, inner surface 46 and outer surface 78 are spaced at least 0.125 inches apart.

Insert 70 may be of several different configurations as is disclosed in co-pending application Ser. No. 09/136,364 entitled INSERT FOR A CYCLONE SEPARATOR filed concurrently herewith, all of which is incorporated herein by reference.

Figure 13:
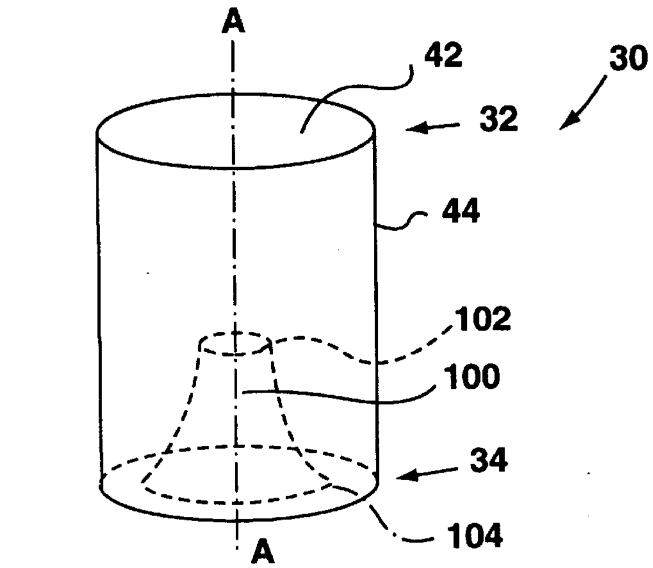
FIG. 13 is a cyclone separator according to the instant invention.

In accordance to the instant invention, a cyclone separator 30 is provided with a terminal insert 100. Terminal insert 100 has an upstream end 102 a downstream end 104 and an outer surface 106. Terminal insert comprises a member positioned within cavity 42 to imping upon at least a portion of fluid 48 as it rotates within cavity 48 to destructively interfere with the rotational motion of fluid 48 within cavity 42. Preferably, terminal insert 100 impinges to a sufficient degree whereby fluid 48 has insufficient momentum to maintain a cyclonic flow in cavity 42. As shown in FIG. 13, insert 100 may be centrally positioned along the longitudinal axis A—A of cavity 42 and extend outwardly to imping upon at least a portion of fluid 48 as it rotates in cavity 42. As the diameter of terminal insert 100 increases, it will increasingly imping upon fluid 48 and result in a change in the rotational velocity of fluid 48 in cavity 42. If the rotational velocity is decreases to a sufficient point, then the cyclonic flow of fluid 48 in cavity 42 will be terminated.

It will be appreciated that terminal insert may have a variety of configurations. For example, as shown in FIGS. 13 and 14(*a*), insert 100 may be a generally trumpet shaped member. Alternately, as shown in FIGS. 14(*b*) and (*c*) insert 100 may be a generally trumpet shaped member which has a plurality of longitudinally extending vanes 108 provided thereon. Vanes 108 extend outwardly into fluid 48 as it rotates in cavity 42 thereby disrupting the cyclonic flow of fluid 48 therein.

As shown in FIG. 14(*d*), insert 100 may comprise a plurality of longitudinally extending members (such as rods), which extend upwardly into cavity 48. The rods may be secured to the bottom surface of cyclone separator 30. Alternately, the rods may be affixed in a position exterior to cavity 42 and extend into cavity 42 so as to interact with fluid 48 to disrupt its rotational motion. It will be appreciated that the rods may be positioned symmetrically around longitudinal axis A—A. Alternately, they may be positioned non-symmetrically there around. It will also be appreciated that rods may be a variety of shapes such as, in transverse section, squares, ellipses or other closed convex or abode shapes. Further, the transverse section of terminal insert 100 may vary longitudinally.

As shown in FIG. 14(*e*), insert 100 may comprise a member that is longitudinally positioned within cavity 42 and has a plurality of arms 110 which extend outwardly therefrom and preferably radially outwardly therefrom. Each of the arms 100 may have the same transverse length and cross sectional profile. Alternately, as shown in FIG. 14(*e*) arms 110 may have a transverse length that increases towards bottom end 34 of cavity 42 so as to create a discontinuous profile similar to that of insert 100 shown in FIG. 14(*a*).

Figure 12:
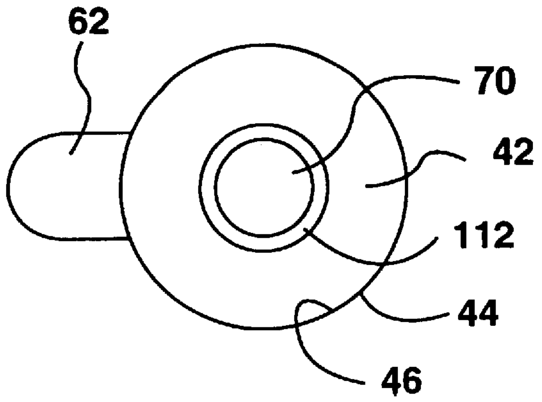
FIG. 12 is a cross sectional view along line 12—12 in FIG. 7.

In a further alternate embodiment, as shown in FIGS. 7 and 12, terminal insert 100 may have a helical member 112 extending there around.

It is particularly preferred to incorporate a terminal insert 100 in a unidirectional flow cyclone as shown in FIGS. 7 and 12. In this figures, terminal insert 100 is provided as a longitudinally continuation of insert 70. It will be appreciated that terminal insert 100 need not be connected to insert 70 but may be separately mounted therein or, in fact, cyclone separator may not have an insert 70. According to this embodiment, fluid 48 travels downstream through cavity 42 from top end 32 to bottom end 34. Separated material 54 travels downwardly into collecting chambers 62 as shown by arrows 56. As fluid 48 rotates around cavity 42, the radially inner portion thereof encounters outer wall 106 of terminal insert 100 which decreases the rotational velocity of fluid 48 thereby reducing and, preferably, terminating the cyclonic flow of fluid 48 in the lower portion of cavity 42.

This has two advantages. First, by reducing or terminating the cyclonic flow of fluid 48 in the lower portion of cavity 42, fluid 48 is easier to direct into fluid outlet port 38. Further, when the cyclonic flow of fluid 48 in cavity 42 is terminated, fluid 48 commences to travel at a relatively slow speed in cavity 42 thereby preventing the re-entrainment of separated material 54. It will be appreciated that instead of having a sealed collecting chamber as shown in FIG. 7, collecting chamber may have a distal end 114 which defines an open passage which extends to convey separated material 54 away from cavity 42.

In the longitudinal direction defined by axis A—A, inner surface 46 is preferably continuous. By this term, it is meant that, while inner surface 46 may change direction longitudinally, it does so gradually so as not to interrupt the rotational movement of fluid 48 within cavity 42. It will be appreciated that, in the longitudinal and/or the transverse direction, that inner surface 46 of cavity 12 and/or outer surface 78 of wall 76 may be defined by a plurality of straight line portions, each of which extends for a finite length. Inner surface 46 may be defined by 3 or more such segments, preferably 5 or more such segments and most preferably, 10 or more such segments.

It will also be appreciated that, depending upon the degree of material which is required and the composition of the material in the fluid to be treated that a plurality of cyclone separators each of which, or only some of which, may be connected in series. The plurality of separators may be positioned side by side or nested (one inside the other) as is shown in FIG. 10.

We claim:

1. A terminal insert for a cyclone separator for separating a material from a fluid, the separator having a longitudinally extending body and a wall, the wall having an inner surface and defining an internal cavity having an outer portion in which the fluid rotates when the separator is in use and an inner portion, the terminal insert comprising a distinct member positioned within the longitudinally extending body to impinge upon at least a portion of the fluid as the fluid rotates within the cavity to destructively interfere with the rotational motion of the fluid within the cavity.

2. The terminal insert as claimed in claim 1 wherein the terminal insert is centrally positioned within the cavity and extends outwardly to impinge upon the portion of the fluid.

3. The terminal insert as claimed in claim 1 wherein the cavity has an upstream end and a downstream end and the outer wall of the terminal insert is configured to create an area adjacent the downstream end of the cavity wherein the fluid is travelling at a velocity insufficient to maintain the rotational motion of the fluid within the cavity.

4. The terminal insert as claimed in claim 3 wherein the area has a receiving portion for receiving the material which is separated from the fluid.

5. The terminal insert as claimed in claim 3 wherein the separator is vertically disposed and the receiving portion is positioned towards the lower end of the separator and comprises a collecting chamber in which the separated material is collected.

6. The terminal insert as claimed in claim 3 wherein the separator is vertically disposed and the receiving portion is positioned towards the lower end of the separator and is in flow communication with a collecting chamber in which the separated material is collected.

7. A terminal insert for a cyclone separator for separating a material from a fluid, the separator having a longitudinally extending body and a wall, the wall having an inner surface and defining an internal cavity in which the fluid rotates in a cyclonic pattern when the separator is in use, the terminal insert comprising a member having an outer wall spaced from the inner surface and configured to impart changes in the rate of acceleration to at least a portion of the fluid as the fluid rotates within the cavity to reduce the rotational momentum of the fluid to the point where the fluid has insufficient momentum to maintain a cyclonic flow in the separator.

8. The terminal insert as claimed in claim 7 wherein the terminal insert is centrally positioned within the cavity and extends outwardly to impinge upon the portion of the fluid.

9. The terminal insert as claimed in claim 7 wherein the outer wall of the terminal insert is configured to create an area in the cavity wherein the fluid is travelling at a velocity insufficient to maintain the rotational motion of the fluid within the cavity.

10. The terminal insert as claimed in claim 9 wherein the area has a receiving portion for receiving the material which is separated from the fluid.

11. The terminal insert as claimed in claim 9 wherein the separator is vertically disposed and the receiving portion is positioned towards the lower end of the separator and comprises a collecting chamber in which the separated material is collected.

12. The terminal insert as claimed in claim 9 wherein the separator is vertically disposed and the receiving portion is positioned towards the lower end of the separator and is in flow communication with a collecting chamber in which the separated material is collected.

13. A cyclone separator for separating a material from a fluid comprising:

(a) a longitudinally extending body having a wall and defining a longitudinal axis, the wall having an inner surface which defines an internal cavity having an outer portion in which the fluid rotates when the separator is in use and an inner portion; and, (b) a terminal insert comprising a member having an outer wall spaced from the inner surface and positioned to interact with at least a portion of the fluid as the fluid rotates in the outer portion of the cavity to destructively interfere with the rotational motion of the fluid within the cavity.

14. The cyclone separator as claimed in claim 13 wherein the outer wall of the terminal insert interacts with the portion of the fluid to impart to the portion of the fluid a different speed, a different direction of travel or a different velocity compared to that of the fluid rotating in the outer portion of the cavity.

15. The cyclone separator as claimed in claim 13 wherein at least a portion of the outer wall is configured to continuously impart changes in the rate of acceleration to the fluid as the fluid rotates within the cavity.

16. The cyclone separator as claimed in claim 13 wherein the terminal insert is centrally positioned within the cavity and extends outwardly to impinge upon the portion of the fluid.

17. The cyclone separator as claimed in claim 13 wherein the outer wall of the terminal insert is configured to create an area in the cavity wherein the fluid is travelling at a velocity insufficient to maintain the rotational motion of the fluid within the cavity.

18. The cyclone separator as claimed in claim 17 wherein the area has a receiving portion for receiving the material which is separated from the fluid.

19. The cyclone separator as claimed in claim 17 wherein the separator is vertically disposed and the receiving portion is positioned towards the lower end of the separator and comprises a collecting chamber in which the separated material is collected.

20. The cyclone separator as claimed in claim 17 wherein the separator is vertically disposed and the receiving portion is positioned towards the lower end of the separator and is in flow communication with a collecting chamber in which the separated material is collected.

21. The separator as claimed in claim 13 wherein at least a portion of the inner surface of the wall is defined by a continuous n-differentiable curve swept 360 degrees around the axis wherein $n \geqq 2$ and the second derivative is not zero everywhere.

22. The separator as claimed in claim 13 wherein at least a portion of the inner surface of the wall is defined by a plurality of straight lines which approximate a continuous n-differentiable curve swept 360 degrees around the axis wherein $n \geqq 2$ and the second derivative is not zero everywhere.

23. The separator as claimed in claim 13 wherein the internal cavity has, in transverse section, an inner portion in which the fluid rotates when the separator is in use and at least one outer portion positioned external to the inner portion and contiguous therewith, the outer portion of the cavity extending outwardly from the inner portion of the cavity and defining a zone in which at least a portion of the fluid expands outwardly as the fluid rotates in the plane defined by the transverse section, the portion of the fluid in the outer portion of the cavity having different fluid flow characteristics compared to those of the fluid rotating in the inner portion of the cavity which promote the separation of the material from the fluid.

24. The separator as claimed in claim 13 wherein in transverse section, the wall extends in a continuous closed path and has a non-baffled inner surface which defines an internal cavity, the internal cavity having an inner portion in which the fluid rotates when the separator is in use, and at least one outer portion positioned external to the inner portion and contiguous therewith defining a zone in which the wall is configured to impart to at least a portion of the fluid as the fluid rotates in the plane defined by the transverse section different fluid flow characteristics compared to those of the fluid rotating in the inner portion of the cavity, which characteristics promote the separation of the material from the fluid.

25. The separator as claimed in claim 13 wherein the inner surface of the wall is defined by, in transverse section, a continuous non-circular convex closed path, the cavity having an inner portion positioned within the non-circular convex closed path and at least one outer portion between the inner portion and the non-circular convex closed path.

26. The separator as claimed in claim 13 wherein the separator comprises a dirt filter for a vacuum cleaner.

27. The separator as claimed in claim 13 wherein the separator comprises an air inlet for turbo machinery.

28. The separator as claimed in claim 13 wherein the separator comprises treatment apparatus positioned upstream of a fluid pump.

29. The separator as claimed in claim 13 wherein the separator comprises treatment apparatus positioned upstream of a pump for a gas.

30. The separator as claimed in claim 13 wherein the separator comprises treatment apparatus positioned upstream of a pump for a liquid.

31. A method of separating a first material from a fluid stream comprising the steps of:

(a) introducing a fluid to flow cyclonically in a cavity having a cyclonic flow region;

(b) destructively interfering with the rotational motion of the fluid within the cavity; and (c) removing the fluid flow from the cyclonic flow region.

32. The method as claimed in claim 31 wherein step (b) comprises imparting changes in the rate of acceleration to at least a portion of the fluid as the fluid rotates within the cavity to reduce the rotational momentum of the fluid to the point where the fluid has insufficient momentum to maintain a cyclonic flow in the separator.

33. The method as claimed in claim 31 wherein the cyclonic flow region has an inner portion and step (b) comprises interacting with the fluid rotating in the inner portion.

34. The method as claimed in claim 32 wherein the cyclonic flow region has an inner portion and step (b) comprises interacting with the fluid rotating in the inner portion.

35. The method as claimed in claim 31 further comprising the step of maintaining the cyclonic flow of fluid in the cyclonic flow region and subsequently destructively interfering with the rotational motion of the fluid within the cavity.

* * * * *